United States Patent [19]

Briehl

[11] 4,419,906
[45] Dec. 13, 1983

[54] TORQUE DIVISION GEARING CONNECTION ASSEMBLY

[75] Inventor: Gerhard Briehl, Bocholt, Fed. Rep. of Germany

[73] Assignee: WGW Westdeutsche Getriebe- und Kupplungswerke GmbH, Fed. Rep. of Germany

[21] Appl. No.: 195,004

[22] Filed: Oct. 8, 1980

[30] Foreign Application Priority Data

Oct. 13, 1979 [DE] Fed. Rep. of Germany ....... 2941553

[51] Int. Cl.³ .......................... F16H 35/00; F16D 1/12
[52] U.S. Cl. ........................................ 74/413; 74/395; 403/4; 403/359
[58] Field of Search ................. 74/395, 413, 414, 400, 74/401, 409, 410; 403/1, 3, 4, 359

[56] References Cited

U.S. PATENT DOCUMENTS

| 1,438,289 | 12/1922 | Barbarou | 74/414 |
| 1,460,768 | 7/1923 | Royce | 74/414 |
| 1,511,910 | 10/1924 | Royce | 403/4 |
| 1,720,422 | 7/1929 | Manville | 403/4 |
| 1,740,756 | 12/1929 | Weis | 74/410 |
| 2,443,688 | 6/1948 | McFarland | 403/359 X |
| 2,621,370 | 12/1952 | Denton | 74/395 X |
| 3,398,596 | 8/1968 | Jahnke | 74/413 |
| 3,991,629 | 11/1976 | Dearnley | 403/359 X |

Primary Examiner—Rodney H. Bonck
Attorney, Agent, or Firm—Hill, Van Santen, Steadman & Simpson

[57] ABSTRACT

A torque division gearing assembly having an intermediate shaft drivingly connected with the output drive shaft is provided with a pre-fabricated bush means permitting angular positioning of the intermediate shaft in its torque branch gear train. An intermediate shaft gear for driving the intermediate shaft is connected by key means to a bushing element positioned concentrically about the intermediate shaft and rotatable relative thereto. The bushing element is provided at its opposite end with a gear teeth connection for interlocking with a corresponding gear tooth ring formed on a connection bush. At the other end of the connection bush, there is formed another gear teeth ring of reduced diameter for meshing with a corresponding gear teeth portion formed on the intermediate shaft. The two gear teeth rings on the connection bush have different diametral pitches, preferably amounting to one, in order to permit angular adjustment between the shaft and gear without disrupting the drive connection therebetween.

52 Claims, 2 Drawing Figures

TORQUE DIVISION GEARING CONNECTION ASSEMBLY

BACKGROUND OF THE INVENTION

1. Field of the Invention

The invention relates to a torque division gearing and, more particularly, to torque division gearing having at least two torque branches having gears for driving intermediate shafts driving a common gear wheel connected to an output shaft.

2. The Prior Art

In torque division gear drives, the position of individual gears in parallel gear trains must be aligned. To attain proper alignment, gears leading to an intermediate shaft driving gear and an intermediate shaft for driving a larger gear wheel connected to a drive output shaft are first mounted in free fit fashion so that a suitable angular position for the intermediate shaft gear can be adjustably set by means of rotation. The appropriate angular alignment position is then marked and grooves for a wedge coupling between the intermediate shaft and the intermediate shaft gear are milled in accordance with the marked positioning. Such a method of alignment is complex and costly because of the manpower and time required.

It is also known to frictionally connect the intermediate shaft gear to the intermediate shaft by means of tension settings, oil pressure connections, or the like in order to avoid the extra time and high costs associated with the alignment method. However, frictional connections are often ineffective and not preferred by the trade in the case of high intermittently loaded gearings.

The present invention provides for simple angular adjustment in the assembly of an intermediate shaft gear to an intermediate shaft by means of a pre-fabricated connection structure which is reliable for high load gear systems.

SUMMARY OF THE INVENTION

A torque branch gear train in a torque division gearing assembly includes an intermediate shaft for driving a gear wheel connected to an output shaft and an intermediate shaft gear for driving the intermediate shaft. In drive series connection between the gear and the intermediate shaft is a connection bush having two gear rings of different diametral pitches. One gear ring is drivingly connected with a cooperating gear teeth arrangement formed on the intermediate shaft; while the other gear ring receives torque transmission from the intermediate shaft gear. The different diametral pitches of the connection bush gear rings enable adjustable angular alignment of the intermediate shaft relative to the gear without the need for marking and requiring a wedge connection.

The connection bush gear rings have different diameters and contain trapezoidal-shaped gear teeth. The connection bush takes up a relatively small amount of space and is positioned adjacent a free end of the intermediate shaft projecting axially from an end support bearing for the shaft. An axial stop means in the form of a cap element is secured by screws to the free end of the intermediate shaft for limiting axial movement of the connector bush which is positioned concentrically about the free end of the intermediate shaft. In torque division gearing assemblies having axially fixed shafts, a clamping means, such as a radially extending screw or ring, may be used to seat the cooperating teeth of the connection bush gear rings once desired positioning of the intermediate shaft is found. In this manner, deflection due to variable loads is minimized. The intermediate shaft and/or the connection bush may further contain bores for the supply of oil pressure therethrough.

The difference in diametral pitches of the connection bush gear rings is small, preferably amounting to one, such that a very precise adjustment of the angle between the intermediate shaft and gear is possible, particularly when diametral pitch of the connection bush gear teeth is large. The diametral pitches of the connection bush rings lie between 20 and 50, preferably in a range between 30 and 40. It has been found that diametral pitches under 20 do not afford precise angular alignment adjustment and that diametral pitches above 50 are not necessary, even for high load gearing assemblies. The optimum between alignment reliability and assembly costs occurs at diametral pitches in the range of 30 through 40.

DESCRIPTION OF THE PREFERRED EMBODIMENT

Figure 1:
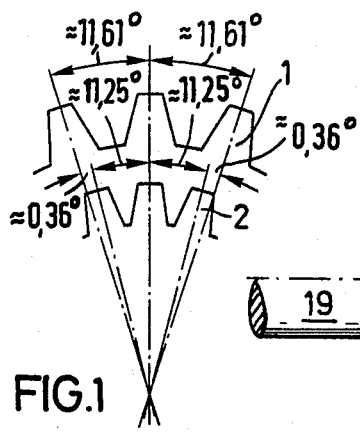
FIG. 1 is a schematic front side elevational view showing a portion of two rings of gear teeth with different diametral pitches contained in a connection bush of the present invention.

In accordance with the present invention, a connection bush assembly (12 in FIG. 2) serves to connect a gear in a torque branch gear train for a torque division gearing assembly to an intermediate shaft which drives a gear wheel connected to the output shaft. The connection bush contains two gear teeth rings milled at opposed ends of the bush with different diametral pitches and having different diameters. With reference to FIG. 1, the radially outermost gear ring may have 31 teeth (m=6), and the inner gear ring 2 may contain 32 (m=5). The tooth shape of the respective gear teeth is preferably trapezoidal, which has been found to be particularly advantageous with respect to manufacture and wear. The pitch angle, or center-to-center angle by which gear teeth are spaced from one another, for ring 1 is approximately 11.61° and the pitch angle for ring 2 is approximately 11.25°. The difference in pitch angles (Δ) thus amounts to approximately 0.36°. Such a pitch angle difference has been found to be sufficient for normal precision required in setting the proper alignment between the gear and intermediate shaft in a torque division gearing assembly. Since the maximum axial displacement of a floating output shaft for a torque division gearing assembly is approximately 0.8 mm, the angular adjustability of the intermediate shaft is good enough in any case to leave the floating shaft in its centered position.

Figure 2:
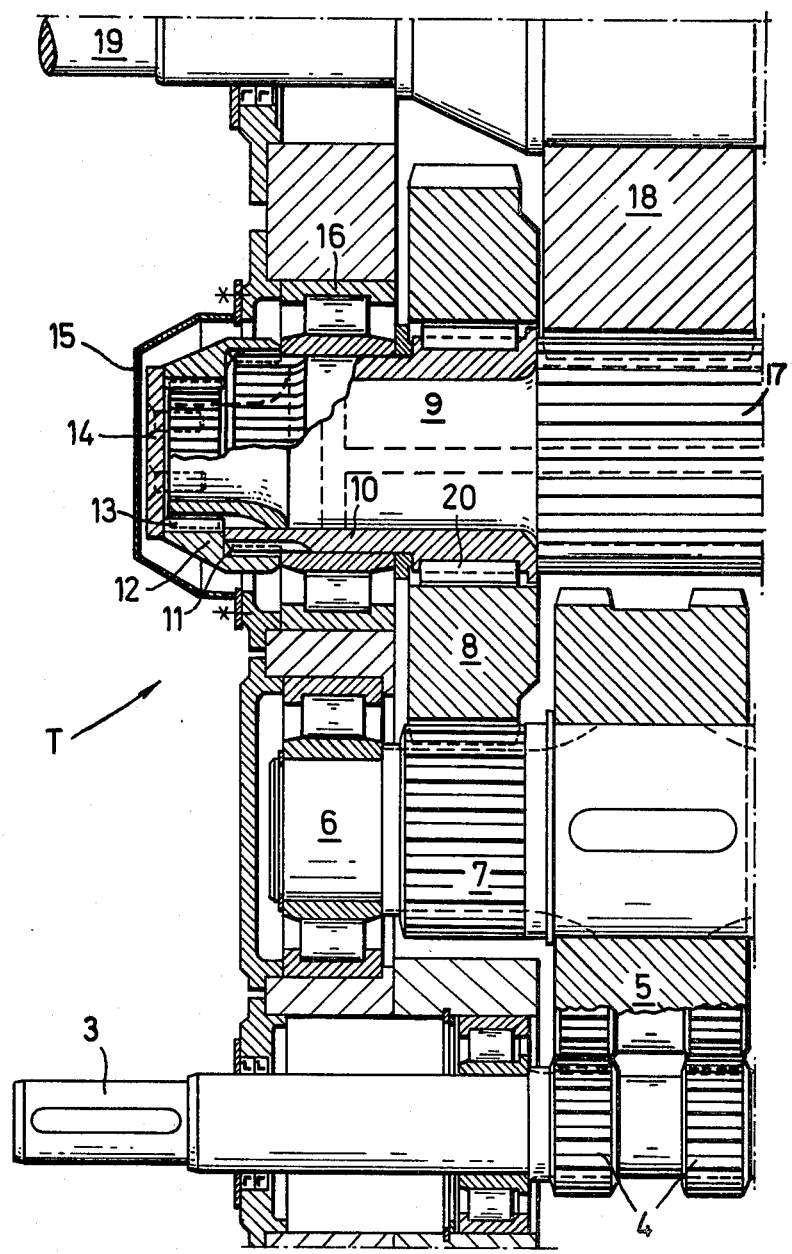
FIG. 2 is a cross-sectional side elevational view of one torque branch for a torque division gearing assembly having a connection bush of the present invention between an intermediate shaft gear and an intermediate shaft.

With reference to FIG. 2, an input shaft 3, leading to a torque branch T for a torque division gearing assembly, is provided at its driving end with two spaced gear pinions 4. The teeth of pinions 4 mesh with cooperating teeth formed on a gear wheel 5 disposed on a rotary shaft 6. The shaft 6 carries intermediately thereof a pinion 7 for engaging with an intermediate shaft 9. An elongated bushing element 10 fits concentrically about the intermediate shaft 9 and beneath the intermediate shaft gear 8. The bushing element 10 is drivingly connected to the gear 8 by slot-fit type key means 20. At the axial end of the bushing 10 opposed from its connection with the gear 8, there is formed a radially outwardly directed toothing arrangement for interconnection with a gear ring 11 formed on a connection bush 12. The connection bush 12 is formed with another radially inwardly directed gear ring 13 at its other axial end. The gear ring 13 engages in a corresponding gear teeth arrangement formed on the exterior of the intermediate shaft 9. The connection bush gear teeth rings 11 and 13 are of different diametral pitches and diameters as mentioned above. In this manner, the intermediate gear 8 and the intermediate shaft 9 are placed in drive connection with one another in a way which minimizes slippage and yet permits positional adjustment relative to one another.

The connection bush 12 is positioned adjacent a free end of the intermediate shaft supported for rotation away from its free end by bearing means 16. A stop means 14 is detachably secured by screws on the free end face of the shaft 9 to serve as an end stop for the bush 12. A concentrically arranged housing cover 15 encloses the connection bush 12 and respective free end of the shaft 9.

For purposes of illustration of operation, the torque branch T is presumed to be one of two torque branches brought together in the torque division gearing assembly. The input shaft 3 transmits its torque to the gear wheel 5 by means of the toothed pinions 4. Accordingly, one-half of the torque is transmitted by the gear 7 to the intermediate shaft gear 8. The gear 8 serves to rotate the bushing element 10 via the key connection 20 and the bushing 10 drives the connection bush 12 via the toothing 11. From the connection bush 12, shaft 9 is rotated via the toothing 13. From the intermediate shaft, torque is taken off at a pinion 17 formed on the intermediate shaft 9 and which meshes with a larger gear wheel 18 connected to the output drive shaft 19. The pinion of the second torque branch, not shown in the drawing, also engages at the larger gear wheel 18 where the two torque branches are brought together.

The connection bush 12 enables the intermediate shaft 9 to be adjustably positioned within the torque branch T and permit precise centering of the output shaft 19 within the overall torque division gearing assembly. A reduction in the overall width of the gearing assembly is provided, along with the assurance of uniform forces throughout the gearing. In torque division gearings with axially fixed shafts, as shown in the preferred embodiment, the cooperating gear teeth of the connection bush means can be fixably seated after alignment by a clamping means, such as a radially extending screw or ring. In order to facilitate disassembly, such as for repair purposes, it is also possible to extend oil-pressure supply lines through the intermediate shaft 9, as shown by dotted lines in FIG. 2, and/or the connection bush 12. It is also possible in this manner to disassemble an intermediate shaft from the connection bush, such as when the shafts have been in operation for longer times, without damage occurring at the connection bush.

The present invention can also be employed with equal advantage in torque division gearing assemblies having axially displaceable division shafts for the torque. Further, it is also possible to provide other gearings with torque division, for example planatary gears or tapered spur wheel gearings functioning with torque division, utilizing the present invention bushes in order to achieve a uniform torque division.

Although various minor modifications may be suggested by those versed in the art, it should be understood that I wish to embody within the scope of the patent warranted hereon all such modifications as reasonably and properly come within the scope of my contribution to the art.

I claim as my invention:

1. A torque division gearing assembly apparatus having an input to at least two torque branch gear trains for driving a common output shaft, at least one torque branch gear train including a gear for driving an intermediate shaft having a pinion formed thereon for driving connection with a corresponding gear wheel connected with said output shaft, wherein the drive connection between said gear and said intermediate shaft comprises a connection bush having two gear teeth rings of different diametral pitches, one said ring for receiving torque transmission from said gear and the other for transmitting torque to said intermediate shaft, and a bushing element rotatable about and relative to said intermediate shaft and having at one end key means for driving connection with said gear and at the other end gear teeth means for corresponding meshing with one of said connection bush gear rings.

2. The apparatus of claim 1, wherein the difference in the diametral pitches of said two gear rings is one.

3. The apparatus of claim 2, wherein said two rings have different diameters.

4. The apparatus of claim 1, wherein the diametral pitches of said two gear rings are between 20 and 50.

5. The apparatus of claim 4, wherein the diametral pitches of said two gear rings are between 30 and 40.

6. The apparatus of claim 5, wherein said two rings have different diameters.

7. The apparatus of claim 1, wherein said two gear rings have different diameters.

8. The apparatus of claim 7, wherein said intermediate shaft is supported adjacent a free end thereof by bearing means, said free end projecting axially from said bearing, said connection bush being positioned concentrically about said free end.

9. The apparatus of claim 8, further comprising a detachable stop element at said free end for limiting axial displacement of said connection bush relative to said intermediate shaft.

10. The apparatus of claim 1, wherein the shape of the teeth in said gear rings is trapezoidal.

11. The apparatus of claim 1, further comprising stop means for adjustably seating said connection bush, said connection bush being positioned concentrically about said intermediate shaft.

12. The apparatus of claim 1, further comprising oil pressure supply line means extending through said intermediate shaft.

13. The apparatus of claim 1, wherein said two connection bush gear rings have different diameters, said larger diameter ring engaging with said gear teeth means on said bushing element.

14. A torque division gearing assembly apparatus having an input to at least two torque branch gear trains for driving a common output shaft, at least one torque branch gear train including a gear for driving an intermediate shaft having a pinion formed thereon for driving connection with a corresponding gear wheel connected with said output shaft, wherein the drive connection between said gear and said intermediate shaft comprises a connection bush having two gear teeth rings of different diametral pitches, one said ring for receiving torque transmission from said gear and the other for transmitting torque to said intermediate shaft, wherein the diametral pitches of said two gear rings are between 20 and 50.

15. The apparatus of claim 14, wherein the difference in the diametral pitches of said two gear rings is one.

16. The apparatus of claim 15, wherein said two rings have different diameters.

17. The apparatus of claim 14, further comprising oil pressure supply line means extending through said intermediate shaft.

18. The apparatus of claim 14, wherein the diametrical pitches of said two gear rings are between 30 and 40.

19. The apparatus of claim 18, wherein said two rings have different diameters.

20. The apparatus of claim 14, wherein said two gear rings have different diameters.

21. The apparatus of claim 20, wherein said intermediate shaft is supported adjacent a free end thereof by bearing means, said free end projecting axially from said bearing, said connection bush being positioned concentrically about said free end.

22. The apparatus of claim 21, further comprising a detachable stop element at said free end for limiting axial displacement of said connection bush relative to said intermediate shaft.

23. The apparatus of claim 14, wherein the shape of the teeth in said gear rings is trapezoidal.

24. The apparatus of claim 14, further comprising a bushing element rotatable about and relative to said intermediate shaft and having at one end key means for driving connection with said gear and at the other end gear teeth means for corresponding meshing with one of said connection bush gear rings.

25. The apparatus of claim 24, wherein said two connection bush gear rings have different diameters, said larger diameter ring engaging with said gear teeth means on said bushing element.

26. A torque division gearing assembly apparatus having an input to at least two torque branch gear trains for driving a common output shaft, at least one torque branch gear train including a gear for driving an intermediate shaft having a pinion formed thereon for driving connection with a corresponding gear wheel connected with said output shaft, wherein the drive connection between said gear and said intermediate shaft comprises a connection bush having two gear teeth rings of different diametral pitches, one said ring for receiving torque transmission fron said gear and the other for transmitting torque to said intermediate shaft, the shape of the teeth in said gear rings being trapezoidal.

27. The apparatus of claim 26, wherein the difference in the diametral pitches of said two gear rings is one.

28. The apparatus of claim 27, wherein said two rings have different diameters.

29. The apparatus of claim 26, wherein the diametral pitches of said two gear rings are between 20 and 50.

30. The apparatus of claim 29, wherein the diametral pitches of said two gear rings are between 30 and 40.

31. The apparatus of claim 30, wherein said two rings have different diameters.

32. The apparatus of claim 26, wherein said two gear rings have different diameters.

33. The apparatus of claim 32, wherein said intermediate shaft is supported adjacent a free end thereof by bearing means, said free end projecting axially from said bearing, said connection bush being positioned concentrically about said free end.

34. The apparatus of claim 33, further comprising a detachable stop element at said free end for limiting axial displacement of said connection bush relative to said intermediate shaft.

35. The apparatus of claim 26, further comprising stop means for adjustably seating said connection bush, said connection bush being positioned concentrically about said intermediate shaft.

36. The apparatus of claim 26, further comprising oil pressure supply line means extending through said intermediate shaft.

37. The apparatus of claim 26, further comprising a bushing element rotatable about and relative to said intermediate shaft and having at one end key means for driving connection with said gear and at the other end gear teeth means for corresponding meshing with one of said connection bush gear rings.

38. The apparatus of claim 37, wherein said two connection bush gear rings have different diameters, said larger diameter ring engaging with said gear teeth means on said bushing element.

39. A torque division gearing assembly apparatus having an input to at least two torque branch gear trains for driving a common output shaft, at least one torque branch gear train including a gear for driving an intermediate shaft having a pinion formed thereon for driving connection with a corresponding gear wheel connected with said output shaft, wherein the drive connection between said gear and said intermediate shaft comprises a connection bush having two gear teeth rings of different diametral pitches, the difference in the diametral pitches being approximately one, one said ring for receiving torque transmission from said gear and the other for transmitting torque to said intermediate shaft.

40. The apparatus of claim 39, wherein the difference in the diametral pitches of said two gear rings is one.

41. The apparatus of claim 40, wherein said two rings have different diameters.

42. The apparatus of claim 39, wherein the diametral pitches of said two gear rings are between 20 and 50.

43. The apparatus of claim 42, wherein the diametral pitches of said two gear rings are between 30 and 40.

44. The apparatus of claim 43, wherein said two rings have different diameters.

45. The apparatus of claim 39, wherein said two gear rings have different diameters.

46. The apparatus of claim 45, wherein said intermediate shaft is supported adjacent a free end thereof by bearing means, said free end projecting axially from said bearing, said connection bush being positioned concentrically about said free end.

47. The apparatus of claim 46, further comprising a detachable stop element at said free end for limiting axial displacement of said connection bush relative to said intermediate shaft.

48. The apparatus of claim 39, wherein the shape of the teeth in said gear rings is trapezoidal.

49. The apparatus of claim 39, further comprising stop means for adjustably seating said connection bush, said connection bush being positioned concentrically about said intermediate shaft.

50. The apparatus of claim 39, further comprising oil pressure supply line means extending through said intermediate shaft.

51. The apparatus of claim 39, further comprising a bushing element rotatable about and relative to said intermediate shaft and having at one end key means for driving connection with said gear and at the other end gear teeth means for corresponding meshing with one of said connection bush gear rings.

52. The apparatus of claim 51, wherein said two connection bush gear rings have different diameters, said larger diameter ring engaging with said gear teeth means on said bushing element.

* * * * *